United States Patent Office 3,348,121
Patented Oct. 17, 1967

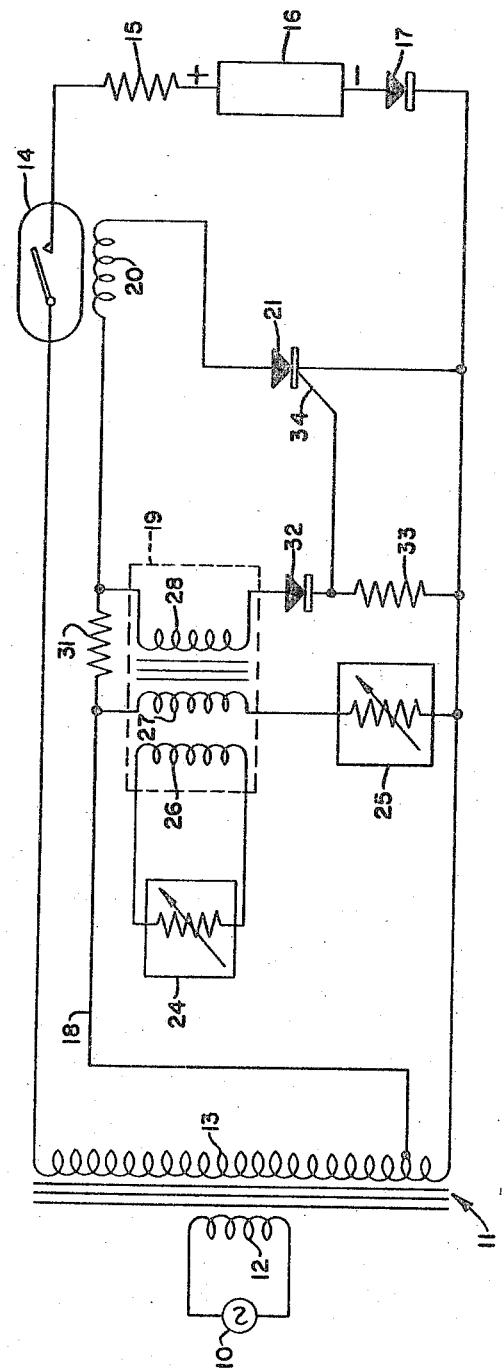

3,348,121
HIGH VOLTAGE SYNCHRONOUS SWITCH
Nanjundiah N. Murthy, Norwalk, Conn., assignor to American Machine & Foundry Company, a corporation of New Jersey
Filed July 11, 1963, Ser. No. 294,300
4 Claims. (Cl. 321—16)

This invention relates to switching circuits, and more particularly to switching circuits for supplying adjustable amounts of current from a high voltage AC supply to a load.

It is often desirable to connect a supply of relatively high voltage AC to a load in such a manner that the amount of current supplied to the load may be continuously and precisely controlled, and it is accordingly an object of this invention to provide a synchronous switching circuit to perform that function.

Controlling current in such a fashion by means of a switching system requires repeated interruption of the connection between the AC supply and the load. A switch of the type which has a pair of physically separable contacts is usually desirable for applications where a high voltage line must be interrupted, since such switches can easily be obtained with sufficient spread between the opened contacts to accommodate any value of high voltage. If this interruption is effected by the opening and closing of a pair of switch contacts, however, the life of these contacts is adversely affected by their tendency to draw an arc each time they are opened to interrupt a current carrying circuit. It is accordingly another object of this invention to provide such a synchronous switching system in which a pair of switch contacts series connected between the AC supply and the load is opened only when there is substantially no current flowing in the circuit.

It is still another object of this invention to provide such a synchronous switching system in which the amount of current supplied to the load may be easily and accurately controlled.

It is a further object of this invention to provide such a synchronous switching system which is simple and economical to construct.

It is a still further object of this invention to provide such a synchronous switching system utilizing standard, highly reliable components, so that the resulting system is itself a highly reliable system having a long life expectancy.

The above objectives are achieved broadly by synchronizing the periods of actuation of the pair of switch contacts, which control the supply of high voltage AC current to the load device, with the cyclical variations in the AC current flow in such a manner that the opening of the contact pair at the end of each period of actuation occurs at the end of each alternate half-cycle of AC current fluctuation, when the current flowing through the circuit is substantially zero. Variation in the amount of current supplied to the load is obtained by varying the start of each period of actuation (the time of closing the contacts) with respect to the end of the corresponding half-cycle. The periods of actuation of the contact pair are determined by a control circuit which includes a switch, which may be of the low voltage type, and a synchronizing circuit for closing the contact pair only when the switch is energized. The switch is so connected to the AC supply that it is conditioned for energization only during alternate half-cycles; and the point during each alternate half-cycle at which the switch is energized is determined by some type of adjustable means connected to it.

The manner in which the invention fulfills the above and other objectives may be understood more clearly by reference to the following detailed description taken in conjunction with the drawing, which forms a part of the specification, and which shows a schematic diagram of a specific embodiment of this invention in a switching system suitable for controlling, in accordance with the values of sensed conditions, the amount of high voltage DC current supplied to an electrodialysis stack in a desalinator.

Turning now to the drawing, an AC source 10, preferably of 117-volt, 60-cycle, is coupled to a step-up transformer 11, having a primary winding 12 and a secondary winding 13. The high voltage AC developed across the complete secondary winding 13, which is on the order of 500 volts or higher, is applied across the series combination of reed switch 14, resistor 15, load 16, and diode 17. A small fraction of the secondary voltage is tapped off via wire 18 and fed to the control circuitry, the main components of which are saturable reactor 19, electromagnetic coil 20, silicon controlled rectifier (SCR) 21, and variable control resistors 24 and 25.

The system operates briefly as follows. Saturable reactor 19 supplies firing triggers to SCR 21 during each of alternate half-cycles of the AC supply. The timing of these triggers, and consequently the length of each period of SCR conduction, is determined by the settings of control resistors 24 and 25. Coil 20 is energized whenever SCR 21 is conductive. The contacts of reed switch 14 are closed by energization of coil 20, and therefore the periods of actuation of reed switch 14 correspond to the periods of conduction of SCR 21. Since the SCR ceases conduction at the end of each alternate half-cycle of the AC supply, the contacts of reed switch 14 open at that time, when substantially no current is flowing in the load circuit.

This embodiment of the invention is particularly adapted for use with a desalinization system for controlling the amount of high voltage DC current supplied to the electrodialysis stack. In such an application, load 16 represents the stack, which removes salt from liquid pumped through it, and control resistors 24 and 25 represent condition sensors for sensing liquid salinity and temperature, respectively, and which operate to control the current supplied to the stack in accordance with the changing values of these parameters. The operation of such a desalinization system and the nature of the control exercised by the condition sensing elements is described in a United States Patent No. 3,269,933 issued on Aug. 30, 1966, and that application should be referred to for further explanation. It is sufficient for purposes of describing the operation of the switching system to state that the current supplied to the stack (load 16) must be continuously and precisely adjusted in accordance with the values of liquid salinity and temperature as evidenced by the resistance values of control resistors 24 and 25, respectively.

Saturable reactor 19 has three windings: a control winding 26; a bias winding 27; and a load winding 28. Variable control resistor 24 is connected across control winding 26. Bias winding 27 is connected in series with variable control resistor 25 across that portion of the secondary voltage which is tapped off between wire 18 and the end of secondary winding 13. One end of load winding 28 is connected through voltage dropping resistor 31 to wire 18. The other end of the load winding is connected to the anode of rectifier 32, and the cathode of that rectifier is connected through resistor 33 to the end of secondary winding 13. Thus, the series combination of resistor 31, load winding 28, rectifier 32, and resistor 33 is connected across the tapped off portion of the secondary voltage. The junction point between resistor 33 and the cathode of rectifier 32 is connected to the control electrode 34 of SCR 21. Electromagnetic winding 20 is connected between one end of load winding 28 and the anode of SCR 21.

Winding 20 is connected in series with SCR 21 across a portion of the AC voltage developed in secondary 13 and serves to actuate reed switch 14 when energized. Therefore, winding 20 will be energized and reed switch 14 actuated whenever SCR 21 is conducting; and winding 20 will be deenergized and switch 14 not actuated whenever SCR 21 is not conducting.

The operation of SCR's is well known. SCR 21 is conditioned for conduction only during positive half-cycles, i.e., during those alternate half-cycles of the AC voltage on secondary winding 13 during which the voltage at the anode of SCR 21 is positive with respect to the voltage at the cathode. During the alternate negative half-cycles, conduction cannot be established in the SCR, and if conduction has been established during a positive half-cycle, it will be terminated at the beginning of a negative half-cycle when the voltage across the anode and cathode of the SCR reverses polarity. During any positive half-cycle, conduction through SCR 21 may be initiated by applying a voltage pulse to control electrode 34 which is positive with respect to the voltage on the cathode. Since resistor 33 is connected directly between the cathode and the control electrode, substantial current flow through resistor 33, in the forward direction of rectifier 32, will establish a triggering voltage and initiate conduction in the SCR. Once conduction has been so initiated, the SCR remains in conduction for the remainder of the positive half-cycle.

The extent of the periods of actuation of reed switch 14, and therefore the amount of current fed to load device 16, is regulated by regulating the point during each positive half-cycle at which SCR 21 is triggered into conduction. This control is effected by variable control resistors 24 and 25 acting through saturable reactor 19.

The manner in which the firing angle of an SCR may be controlled by two such variable resistors acting in conjunction with a three winding saturable reactor has been described in detail in the copending application, Ser. No. 96,453, filed Mar. 17, 1961, referred to above. A brief summary of this operation will be given here; the copending application referred to should be consulted for more details.

Current flow through load winding 28 is permitted only during positive half-cycles (with "positive half-cycles" being defined in the same sense as it was previously for SCR 21) because of diode 32. During a portion of each positive half-cycle, there will be substantially no current flowing through load winding 28 because the core has not yet saturated and the load winding impedance is high. At some time during the positive half-cycle, the core becomes saturated, the impedance of the load winding drops, and a substantial amount of current flows therethrough. The relative portion of the positive half-cycle occupied in bringing the core to saturation is determined by the amount of core reset effected during each alternate, negative half-cycle. The more core reset, the longer time period required to bring the core to saturation during the subsequent positive half-cycle, and the smaller the portion of that positive half-cycle during which substantial current flows through load winding 28. Variable control resistors 24 and 25 control the amount of core reset. The amount of reset is inversely proportional to the amount of resistance of resistor 24; or, put another way, an increase in the period of conduction through load winding 28 is effected by decreasing resistor 24 or increasing resistor 25.

As soon as the core of saturable reactor 19 saturates during any positive half-cycle, the substantial current which suddenly flows through load winding 28 also flows through resistor 33 and generates a voltage drop across that resistor of the appropriate polarity to initiate conduction in SCR 21. While current continues to flow in resistor 33, it is no longer necessary for this energizing signal to be maintained, since once SCR 21 is triggered into conduction, it remains conductive for the rest of the positive half-cycle.

Since SCR 21 becomes non-conductive at the end of each positive half-cycle, coil 20 deenergizes and switch 14 is deactuated at the same time. This point in time (the end of the positive half-cycle) coincides with the point of zero current flow through the load circuit. Therefore, it will be obvious that this system has achieved the desired objective of controlling current flow by controlling the length of the "on" periods of a series connected pair of switch contacts, without having the contacts interrupt a current carrying circuit. Since most of the damage to switching contacts, especially in a high voltage circuit, is accomplished by arcs drawn by the contacts as they open to interrupt a current carrying circuit, it is obvious that this feature is extremely important and advantageous.

Resistor 15, in series with load 16, has a relatively high resistance with respect to the resistance of the load, and acts as a constant current device to reduce the effect on load current of variations in the resistance of load 16. The purpose of diode 17 is to prevent any tendency of the circuit to arc across the contacts of switch 14. Since switch 14 is closed only while current flows through diode 17 in the forward direction, the diode prevents any tendency of reverse voltage to build up to an arc across the contacts of switch 14 during its open period.

While the preferred embodiment of this invention has been described, it is understood that other embodiments and alterations which may suggest themselves to those skilled in the art are encompassed within this invention, which is defined solely in the appended claims.

What is claimed is:

1. A switching system for supplying adjustable amounts of current from a high voltage AC supply to a load without interrupting a current carrying circuit, comprising in combination:

a pair of switch contacts coupled to interrupt all current fed to said load from said AC supply;

synchronizing means coupled to actuate said pair of switch contacts;

switch means conditioned to pass alternate half-cycles of said AC supply coupled to energize said synchronizing means; and adjustable switch actuating means coupled to inhibit said switch means for passing to said synchronizing means a desired portion of each of said alternate half-cycles;

whereby said switch contacts open only at the end of a half-cycle of said AC supply when the current in said circuit interrupted by said contacts is substantially zero.

2. The system of claim 1 wherein:

said switch means comprises a silicon controlled rectifier having a cathode, an anode and a control electrode;

said adjustable switch actuating means is connected to said control electrode;

said anode and cathode are connected across a portion of said AC supply; and said synchronizing means comprises means in series with said anode and cathode of said rectifier adapted to become energized and close said switch contacts when said rectifier is conductive.

3. The system of claim 1 wherein:

said switch contacts are embodied in a reed switch;

said synchronizing means includes electromagnetic coil means positioned adjacent to said reed switch for closing said reed switch when said coil means is energized, said coil means being energized when said switch means is conductive.

4. A switching system for supplying adjustable amounts of current from a high voltage AC supply to a load without interrupting a current carrying circuit, comprising in combination:
  a silicon controlled rectifier having an anode, a cathode, and a control electrode;
  said anode and cathode of said rectifier being connected across a portion of said AC supply, whereby said rectifier is conditioned to pass alternate half-cycles of said supply;
  adjustable switch actuating means coupled to feed to said control electrode a voltage of adjustable magnitude to inhibit the passing of a desired portion of each of said alternate half-cycles;
  a reed switch series connected between said AC supply and said load to interrupt all current fed to said load; and
  electromagnetic coil means connected in series with said anode and said cathode of said rectifier and magnetically coupled to actuate said reed switch when energized,
    whereby said coil means is energized when said rectifier conducts, and, when energized, closes said reed switch, and
    whereby each conductive period of said reed switch terminates at the end of a half-cycle of said AC supply, at which time there is substantially no current in said circuit.

References Cited

UNITED STATES PATENTS

| | | | |
|---|---|---|---|
| 2,820,190 | 1/1958 | Kesselring | 321—48 |
| 2,859,400 | 11/1958 | Kesselring | 321—48 |
| 3,049,642 | 8/1962 | Quinn | 315—206 |
| 3,098,920 | 7/1963 | Bray | 317—149 |
| 3,181,032 | 4/1965 | Myers | 317—148.5 |
| 3,239,723 | 3/1966 | Washington et al. | 317—148.5 |
| 3,252,058 | 5/1966 | Close | 317—148.5 |
| 3,252,420 | 5/1966 | Sosensen | 317—148.5 |

JOHN F. COUCH, *Primary Examiner.*

M. L. WACHTELL, *Assistant Examiner.*